United States Patent [19]

Wirth et al.

[11] 4,336,148

[45] Jun. 22, 1982

[54] COMPLEX COMPOUND, PROCESS FOR THEIR PREPARATION, AND THEIR USE

[75] Inventors: Hermann O. Wirth, Bensheim; Hans-Helmut Friedrich, Lautertal, both of Fed. Rep. of Germany

[73] Assignee: Ciba-Geigy Corporation, Ardsley, N.Y.

[21] Appl. No.: 938,172

[22] Filed: Aug. 30, 1978

[30] Foreign Application Priority Data

Sep. 7, 1977 [CH] Switzerland .................. 10946/77

[51] Int. Cl.³ .................. C07F 15/04; C10M 1/10; C10M 3/02; C10M 5/02; C10M 7/02

[52] U.S. Cl. .................. 252/49.7; 44/68; 44/77; 252/28; 260/429 R; 260/429.5; 260/429.9; 260/438.1; 260/439 R; 260/448 R; 524/385; 556/482; 556/852; 568/6

[58] Field of Search .............. 568/852, 6; 260/439 R, 260/448 AD, 429.5, 438.1, 45.7 P, 45.75 R, 45.75 F, 45.75 N, 45.75 W, 45.75 C, 45.95 L, 429 R, 429.9, 449 R; 556/482, 852; 252/49.7, 28; 44/68, 77

[56] References Cited

U.S. PATENT DOCUMENTS

| | | | |
|---|---|---|---|
| 1,870,858 | 8/1932 | Maximoff | 568/852 |
| 2,150,349 | 3/1939 | Van Peski et al. | 260/439 R X |
| 2,466,445 | 4/1949 | Landau | 260/439 R X |
| 2,666,774 | 1/1954 | Grenall | 260/429.9 |
| 2,840,617 | 6/1958 | Shokal | 568/852 |
| 3,219,635 | 11/1965 | Emrick | 568/852 X |
| 3,256,188 | 6/1966 | Papayannopoulos | 260/429.9 X |
| 3,364,243 | 1/1968 | Daniels | 260/439 R |
| 3,405,153 | 10/1968 | Jones et al. | 260/429.9 X |
| 3,420,932 | 1/1969 | Jones et al. | 260/448 AD X |
| 3,511,864 | 5/1970 | Ugelow et al. | 260/448 AD |
| 3,629,229 | 12/1971 | Schmank | 260/448 R |
| 3,686,249 | 8/1972 | Hartmann | 260/448 AD |
| 3,901,931 | 8/1975 | Rasberger et al. | 260/439 R |
| 3,944,625 | 3/1976 | Neal | 260/439 R X |
| 3,972,868 | 8/1976 | Avela | 260/439 R |
| 4,072,699 | 2/1978 | Merkl | 260/448 AD X |

*Primary Examiner*—Helen M. S. Sneed
*Attorney, Agent, or Firm*—Luther A. R. Hall

[57] ABSTRACT

A complex compound of a metal salt or metalloid salt and an ansolvo-acid or proton-acid, of the general formula I $$M_n{}^m.X_m{}^n.pY.qZ \qquad (I)$$

in which M is a m-valent cation of a metal or metalloid, a metal-oxy or metal-dioxy cation or a hydrogen atom, X is a n-valent anion of a n-basic inorganic proton-acid or of a n-basic organic acid selected from the group of the aliphatic and cycloaliphatic carboxylic acids with up to 8 C atoms, which can be substituted by halogen and/or hydroxyl groups, the aromatic monocarboxylic, dicarboxylic and tricarboxylic acids, which may be substituted by hydroxyl, halogen and/or nitro groups, the organic oxyacids of phosphorus and sulphur, the organic thioacids of phosphorus, and the mercaptans, the inorganic or organic acid having a $pK_a$ value of at most 15.8 or, if M is a proton, of at most 11, Y is water or a neutral organic molecule which can be bound coordinatively by the cation or the anion, Z is a complex-forming vicinal diol with at least 6 C atoms, p is 0 or a value between 0 and 2, q is a value from 1 to 32, m is an integer from 1 to 6 and, if M is a hydrogen atom, is 1 and n is an integer from 1 to 4, and mixtures of such compounds.

6 Claims, No Drawings

COMPLEX COMPOUND, PROCESS FOR THEIR PREPARATION, AND THEIR USE

The present invention relates to complex compounds of preferably inorganic salts and proton-acids or ansolvo-acids with vicinal diols, a process for their preparation, and their use as antistatic additives in natural and synthetic hydrocarbon-based polymers, lubricants and fuels.

It is known to react various inorganic salt-like compounds with monofunctional or polyfunctional alcohols, the resulting compounds being described as alcohol complexes.

For example, U.S. Pat. No. 3,420,932 describes reaction products of basic aluminum salts with organic polyhydroxy compounds; in addition to various diols, glycerol is mentioned. These products, obtained by direct reaction of the basic aluminium salts with the polyhydroxy compounds, have the disadvantage that they are only soluble in polar protic solvents, for example alcohols, but not in non-polar aprotic solvents, for example aliphatic or aromatic hydrocarbons. This behaviour may be explained, for example, by the fact that in the reaction described complex polymers are produced via the formation of an alcoholate, as is stated to be the case for a similar process in German Patent Specification 1,468,537, column 4, lines 10–21. The products described in the latter patent are also sparingly soluble in alcohols but only dispersible in a polar organic solvent, for example a halogenated hydrocarbon.

Anal. Chemie 41 (II), 1456-58 (1969) discloses that barium hydroxide forms alcoholates with diglycerol and that residual free hydroxyl groups of the diglycerol can form chelate bonds with the barium cation. As a result of the strongly polar character of the ligand, these chelated alcohols are also virtually insoluble in hydrocarbons.

Kim. Tekknol. Topal. Masel, 11, 25–28 (1974), describes the reaction of molybdenum pentachloride with $C_{12}$-$C_{14}$-1,2-diols, alcoholates being formed as the reaction products, with elimination of hydrogen halide. Alcoholates from diols and molybdenum halides are also described in German Patent Specification 954,448. These alcoholates are soluble in mineral oils. A disadvantage of these compounds is that active constituents of the compound, in the present case the halogen atoms, are replaced as a result of the formation of the alcoholate.

J. inorg. nucl. Chem., 34, 357–59 (1972) discloses that lanthanum perchlorates in aqueous solution can form complexes with polyols, for example glycerol. These complexes again are insoluble in non-polar aprotic solvents.

Reaction products of, for example, lead oxide, fatty acids or higher carboxylic acids and alkoxy-alcohols, for example 2-ethoxyethanol, or polyols, for example sorbitol, are described, in French Patent Specification 2,264,082, as oil-soluble metal complexes. The solubility of these products results from the carbon-rich acid portion and from the alkoxyalkanol or polyol. Accordingly, this patent does not tackle the problem of converting salts, by means of only one complexing reagent, into products which are then soluble in non-polar aprotic solvents. A disadvantage of the products described is their low heat stability, which results from the low complexing capacity of the proposed alcohols.

German Offenlegungsschrift No. 2,330,906 describes nickel complexes of nickel salts of hydroxy-substituted and alkyl-substituted phenylcarboxylic acids with alcohols or polyols, which complexes have good heat stability and are used as light stabilisers in polymers. This publication again does not tackle the problem of converting salts, by means of one particular complexing reagent, into products which are soluble in, for example, hydrocarbons.

For completeness, it should be mentioned that the category of metal salts complexed with crown ethers can also comprise compounds which are soluble in non-polar, aprotic solvents. A disadvantage of these complexes is that the crown ethers have a specific complexing capacity for certain cations only, and that the synthesis of the crown ethers themselves is expensive and uneconomical.

It is an object of the present invention to provide a complexed heat-stable compound of a metal salt or metalloid salt, and of a proton-acid or ansolvo-acid, which is soluble even in non-polar aprotic solvents and which is an effective antistatic additive in this solvent, in lubricants or in polymers. A further object of the present invention is to provide a general process for the preparation of this complex compound.

The present invention relates to complex compounds of a metal salt or metalloid salt and an ansolvo-acid or proton-acid, which have the composition I

$$M_n{}^m \cdot X_m{}^n \cdot pY \cdot qZ \tag{I}$$

in which M is a m-valent cation of a metal or metalloid, a metal-oxy or metal-dioxy cation or a hydrogen atom, X is a n-valent anion of a n-basic inorganic proton-acid or of a n-basic organic acid selected from the group of the aliphatic and cycloaliphatic carboxylic acids with up to 8 C atoms, which can be substituted by halogen and/or hydroxyl groups, the aromatic monocarboxylic, dicarboxylic and tricarboxylic acids, which may be substituted by hydroxyl, halogen and/or nitro groups, the organic oxyacids of phosphorus and sulphur, the organic thioacids of phosphorus, and the mercaptans, the inorganic or organic acid having a $pK_a$ value of at most 15.8 or, if M is a proton, of at most 11, Y is water or a neutral organic molecule which can be bound coordinatively by the cation or the anion, Z is a complex-forming vicinal diol with at least 6 C atoms, p is 0 or a value between 0 and 2, q is a value from 1 to 32, m is an integer from 1 to 6 and, if M is a hydrogen atom, is 1 and n is an integer from 1 to 4, and mixtures of such compounds.

The composition I only comprises monomeric salts; hence, in the part $M_n{}^m X_m{}^n$ of the formula, the subscript indices n and m are always 1 if the superscript indices m and n are identical. However, in the monomeric salts X can be a polymeric anion.

The m-valent cation is preferably derived from a metal of group 1a to 8a and 1b to 5b of the periodic table of the elements, the lanthanides, uranium, plutonium or the metalloids boron, silicon, germanium and antimony. In the present application, valency is to be understood as the number m of electrons which a metal can release, with formation of a metal ion carrying an m-fold charge, and is familiar to those skilled in the art.

Preferred cations are those of the metals Li, Na, K, Be, Mg, Ca, Sr, Ba, Al, Sc, La, Ce, Eu, Ti, Zr, Hf, Th, V, Nb, Ta, Cr, Mo, W, U, Mn, Fe, Co, Ni, Rh, Pd, Os, Jr, Pt, Cu, Ag, Au, Zn, Cd, Hg, Sn, Pb and Bi and of the metalloids B, Si, Ge and Sb.

In particular, cations of the metals Li, Na, K, Mg, Ca, Sr, Ba, Al, Ti, Zr, V, Cr, Mo, W, Mn, Fe, Co, Ni, Cu, Ag, Au, Zn, Cd, Sn, Pb and Bi and of the metalloids B, Si and Sb deserve mention.

Some metals can also form metal-oxo cations, which contain one or two oxygen atoms. Amongst these titanyl, vanadyl, zirconyl and uranyl are preferred. The tetravalent cation tungstenyl and the monovalent cations antimonyl and bismuthyl should also be mentioned.

The inorganic acid and the organic acids defined above, from which the anion is derived, preferably have a $pK_a$ value of at most 10, especially at most 4; in the case of the strongest acids, this value ranges down to about −10.

It has been found that those of the complex compounds according to the invention, of the formula I, which are derived from strong acids are particularly stable. The upper limit of the $pK_a$ value of 15.8 still includes water as a weak acid.

X is the anion of a n-basic inorganic or organic proton-acid, as defined above. This definition also embraces proton-acids which do not exist in the free form but only in the form of their salts, for example of the ammonium salts. The basicity n indicates the number of negative charges formed in the anion as a result of the elimination of n protons. In addition to the anions of monobasic acids, for example hydrochloric acid, anions of tetrabasic acids, for example silicate or titanate, are also known and n therefore denotes an integer from 1 to 4. X also includes polymeric anions, for example those of the silicates, titanates, phosphates, arsenates, zirconates, vanadates, borates, molybdates, tungstates and antimonates.

The anion X is preferably derived from inorganic proton-acids from the group of the hydrogen halides and hydrogen pseudohalides and hydrogen selenide, the inorganic oxy-acids or thioacids, and the inorganic complex acids.

Examples of the hydrogen halides and hydrogen pseudohalides are HF, HCl, HBr, HI, HCN, HCNO, HCNS and $HN_3$.

The inorganic oxy-acids are preferably derived from the elements C, N, P, As, S, Se, Cl, Br and iodine and from the amphoteric elements and the metalloids. Examples of amphoteric elements are B, Al, Zn, Ti, Si, Zr and Sn.

The inorganic thioacid is preferably $H_2S$ or is derived from the elements C, V, Mo, W, Sn, P, As, Sb and S.

Examples of anions of the oxy-acids of the above elements are: carbonate, bicarbonate, nitrite, nitrate, hypophosphite, phosphite, orthophosphate, polyphosphates, for example diphosphates, metaphosphates, for example metaphosphate, trimetaphosphate or tetrametaphosphate, fluorophosphate, arsenite, arsenate, sulphite, sulphate, peroxomonosulphate, peroxodisulphate, thiosulphate, dithionite, dithionate, pyrosulphite, pyrosulphate, polythionate, fluorosulphate, selenite, selenate, tellurite, tellurate, hypochlorite, chlorite, chlorate, perchloroate, bromite, bromate, iodate and periodate.

Examples of thioacids, in addition to sulphide, are polysulphides, for example disulphide, thiocarbonate, thionocarbonate, thiothionocarbonate, dithionocarbonate, trithiocarbonate, thiovanadate, thiomolybdate, thiotungstate, thiostannate, thioantimonate, thioarsenate, thioarsenite, thioantimonite, trithionophosphate, tetrathiophosphate and trithiophosphite.

Examples of anions of oxy-acids of the amphoteric elements and of the metalloids are: borate, metaborate, silicate, metasilicate, germanate, antimonite, antimonate, aluminate, titanate, zirconate, vanadate, chromate, dichromate, molybdate, tungstate, manganate, permanganate, stannite and stannate. These anions also include polymeric anions.

Anions of inorganic complex acids are to be understood as anions composed of a central metal atom or metalloid atom and complex-forming acido-ligands. Examples of suitable metals and metalloids are B, Si, Ge, As, Sb, Al, Ti, Zr, V, Nb, Ta, Cr, Mo, W, Mn, Zn, Cd, Fe, Co, Ni, Ru, Rh, Pd, Os, Ir, Pt, Cu, Ag, Au, Sn, Pb and Bi. Examples of suitable acido-ligands are the halides, especially fluoride and chloride, the pseudohalides, especially cyanide and thiocyanate, the CO group and oxalate. These complex anions in the main belong to the type $[MX_4]^n$, $[MX_5]^n$ and $[MX_6]^n$, in which M is the metal ion or metalloid ion, X is the acido-ligand and n is the basicity (negative charge) resulting from the valency of the metal or metalloid and the charge of the acido-ligand. It should also be mentioned that the numerous complex anions include polynuclear anions. Examples are: tetrafluoroborate, hexafluorosilicate, hexafluoroarsenate, hexafluoroantimonate, pentafluoroantimonate (III), hexafluorophosphate, tetrafluoroaluminate, hexafluoroaluminate, hexafluorotitanate, hexafluoromolybdate, hexafluorotungstate, hexafluorochromate (III), hexafluoroferrate, hexafluorocobaltate, hexafluoroplatinate, tetrafluorozincate, hexafluorostannate, hexafluoroplumbate, hexafluoromanganate, hexafluororhodanate, hexachloroiridate, hexafluorotantalate, hexafluoroniobate, tetrachloroaluminate, hexachlorotitanate, hexachlorovanadate, tetrachlorovanadate, hexachlorochromate, hexachloromanganate, hexachloromolybdate, hexachlorotungstate, hexachloroferrate, tetrachloronickelate, hexachlororhenate, hexachlororuthenate, hexachloroosmate, hexachlorostannate, hexachloroplumbate, hexachloroantimonate, hexachlorobismuthate, tetrabromocadmiumate, tetracyanozincate, tetrachloromercurate, tetrabromomercurate, tetraiodomercurate, tetracyanomercurate, tetrathiocyanatomercurate, hexacyanovanadate, trioxalatovanadate, hexacyanochromate, trioxalatochromate, pentacyanonitrosochromate, hexacyanomanganate, hexathiocyanatomanganate, trioxalatomanganate, hexacyanoferrate, tetracyanobaltate, tetracyanonickelate, tetracyanocuprate, tetraoxalatozirconate, hexarhodanomolybdate, octacyanomolybdate, octacyanotungstate, octacyanorhenate, hexacyanoplatinate, hexacyanoosmate, tetracyanopalladate, pentacarbonylmanganate, tetracarbonylferrate and tetracarbonylcobaltate.

Some of the complex acids are known in the free form whilst others are only known in the form of their salts, for example the ammonium salts.

X can also be the anion of the n-basic aliphatic or cycloaliphatic carboxylic acid with at most 8 C atoms, preferably 1 to 4 atoms, which can be substituted by halogen or hydroxyl. Preferably, the carboxylic acid is substituted in the α-position, especially by fluorine, chlorine or bromine, and preferably the carboxylic acid is monobasic or dibasic. Examples are formate, acetate, propionate, butyrate, oxalate, malonate, succinate, fumarate, maleate, dithiodipropionate, hydroxyacetate, mono-, di- and tri-fluoroacetate, mono-, di- and trichloroacetate, mono-, di- and tri-bromoacetate, α-chloropropionate, α-chloromalonate, α-bromomalonate, 1,2-dichlorosuccinate and 1,2-dibromosuccinate.

X can also be the anion of an aromatic carboxylic acid with, preferably, at most 12 C atoms, which is preferably selected from the group comprising the monobasic, dibasic and tribasic phenylcarboxylic and naphthylcarboxylic acids, and which can be substituted by halogen, in particular fluorine, chlorine or bromine, or by nitro groups. Examples are benzoate, isophthalate, terephthalate, 2-naphthenate, 2,6-dinaphthenate, chlorobenzoate and nitrobenzoate.

X can also be the anion of an organic oxy-acid of phosphorus and sulphur, and of an organic thioacid of phosphorus. Preferably, such acids are the phosphonic, phosphinic, thiophosphonic, thiophosphinic, sulphonic and sulphinic acids. The acids of phosphorus can be represented by the following general formula:

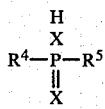

in which $R^4$ is a hydrocarbon radical of aliphatic or aromatic character, with preferably up to 18, especially up to 8, C atoms, which can be substituted by halogen, especially fluorine and chlorine, X can independently be oxygen or sulphur and $R^5$ is the group —XH or a hydrogen atom or independently is defined like $R^4$.

The oxy-acids of sulphur can be represented by the following formula

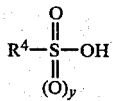

in which $R^4$ is as defined above and y is 0 or 1. $R^4$ can be linear or branched alkyl, cycloalkyl, aryl or aralkyl, which can be substituted, in particular by fluorine or chlorine and by alkyl with 1 to 6 C atoms. Cycloalkyl is preferably cyclohexyl and aryl and aralkyl are preferably derived from phenyl and naphthyl.

Examples are: methyl, ethyl, propyl, butyl, isobutyl, octyl, octadecyl, phenyl, naphthyl, p-methylphenyl, butylphenyl, dibutylphenyl, hexylphenyl, chloromethyl, chloroethyl, chlorophenyl, fluoromethyl and trifluoromethyl.

X can also be the anion of a mercaptan which preferably contains up to 18, especially up to 12, C atoms. Preferably, the mercaptan corresponds to the formula

in which $R^6$ is linear or branched, optionally oxygen-interrupted, alkyl, hydroxyalkyl or alkoxycarbonylalkyl, or phenyl which is unsubstituted or substituted by $C_1$–$C_{12}$-alkyl. Examples are: methyl, ethyl, propyl, hexyl, octyl, decyl, dodecyl, octadecyl, βhydroxyethyl, β-hydroxypropyl, alkoxycarbonylmethyl and β-alkoxycarbonylethyl, for example i-octoxycarbonyl-methyl or -ethyl, thiophenyl and nonylthiophenyl.

The anion Y can also be derived from dibasic, tribasic and tetrabasic oxy-acids which are partially esterified, preferably with $C_1$–$C_{12}$-alkanols or phenols.

The present invention also encompasses mixtures which contain a compound according to the invention, of the formula I, in which X is an anion as defined above, and one or more compounds of the formula I, in which X is an alcoholate anion. The alcoholate anion can be derived from alkanols or phenols with, preferably, 1 to 8 C atoms, in which case X can at the same time also be an alcoholate anion derived from a vicinal diol of the formula Z. Preferably, X only is the last-mentioned alcoholate anion. These mixtures are obtained by reacting a metal alcoholate or metalloid alcoholate, obtained from the abovementioned alcohols and an at least divalent metal or metalloid, with a less than stoichiometric amount of an anhydrous compound of the formula $H_nX^n$ or an ammonium salt of the formula $A_nX^n$. In this reaction, statistical mixtures are obtained, the composition of which is essentially determined by the degree of shortfall from the stoichiometric amount. This mixture may or may not contain unconverted starting material. If X is to be an alkanolate or phenolate anion, a reaction product of a metal or metalloid alcoholate or phenolate with a less than stoichiometric amount of a vicinal diol of the formula Z is employed.

Some preferred anions are hydroxyl, fluoride, chloride, bromide, iodide, cyanide, cyanate, thiocyanate, azide, perchlorate, bromate, iodate, periodate, permanganate, sulphide, bisulphide, hydrogen-difluoride, nitrite, nitrate, sulphite, sulphate, thiosulphate, bisulphate, fluorosulphate, bisulphite, phosphate, hydrogen-phosphate, phosphite, hypophosphite, metaphosphate, polyphosphate, monofluorophosphate, carbonate, bicarbonate, thiocarbonate, thionocarbonate, dithiocarbonate, thionothiocarbonate, trithionocarbonate, carbamate, xanthate, trithionphosphate, tetrathiophosphate, trithiophosphite, silicate, metasilicate, titanate, borate, metaborate, molybdate, vanadate, aluminate, chromate, dichromate, selenate, tungstate, arsenite, arsenate, antimonate, stannate, thioarsenite, thioarsenate, thioantimonate, thiostannate, thiomolybdate, thiotungstate, tetrafluoroborate, hexafluorosilicate, hexafluorotitanate, hexafluoroaluminate, hexachlorostannate, hexachloroferrate, hexacyanoferrate, octacyanomolybdate, hexafluoroantimonate, hexacyanochromate, tetracyanonickelate, trioxalatomanganate, methylphosphonate, methylphosphinate, phenylphosphonate, toxylate, phenylsulphonate, methylsulphinate, formate, acetate, propionate, benzoate, terephthalate, trifluoroacetate, trichloroacetate, chlorobenzoate, trifluoromethylsulphonate, oxalate, malonate, maleate, fumarate, hydroxyacetate, naphthylsulphonate, dithiodipropionate, methylmercaptide, phenylmercaptide, octoxycarbonylmethylmercaptide and β-hydroxyethylmercaptide.

In the compounds according to the invention, of the formula I, particularly preferred anions are those which are derived from inorganic acids which in particular have a $pK_a$ value of at most 7.5, and those derived from organic acids which have a $pK_a$ value of at most 4. If M is a hydrogen atom, the $pK_a$ value is preferably at most 9.5, and more particularly at most 4.

$M_n^m \cdot X_m^n$ can also be an ansolvo-acid. Examples are $BF_3$, $BCl_3$, $AlF_3$, $AlCl_3$, $SiCl_4$, $TiCl_4$, $SnCl_2$, $SnCl_4$, $SbF_5$, boron trialcoholates and alkyl-tin oxides. Further examples are familiar to those skilled in the art.

M in formula I can also be a hydrogen atom. In that case, the formula is to be understood to represent the inorganic and organic oxygen-containing and oxygen-free proton-acids of which the anions have been defined earlier. The oxygen-containing proton-acids are preferred.

Where Y is water, it can, in the compounds of the formula I, be coordinatively bonded to the cation or also to the anion, or be present as water of crystallisation. In some cases the water may not be entirely removable. Preferably, the compounds contain little or no water.

Y in formula I can also be an organic molecule which can be bonded coordinatively, preferably ethanol, diethyl ether, tetrahydrofuran, dimethylformamide, dimethylsulphone or tetramethylenesulphone. These compounds can, in small amounts, remain in the complex compounds of the formula I when the compounds have been prepared in the corresponding solvents.

In general, however, water and the organic molecules mentioned, of the formula Y, can be removed virtually completely, so that p preferably has a value from 0 to 1 and is in particular 0.

The vicinal diol Z can contain 6 to 30 C atoms. Preferably, it contains at least 8 C atoms and especially 8 to 22 C atoms. It may be linear, branched or cyclic. Preferably, it has the formula II

in which R, $R^1$, $R^2$ and $R^3$ independently of one another are a hydrogen atom or linear or branched alkyl with, preferably, up to 22 C atoms, or phenyl, or $R^1$ and $R^2$ together are alkylene with 3 to 6 C atoms. $R^2$ and $R^3$ preferably are alkyl with 1 to 12 C atoms and especially hydrogen atoms and R is preferably alkyl with 1 to 20 C atoms. In a preferred sub-group, $R^1$ and $R^2$ are hydrogen atoms and R and $R^3$ independently of one another are alkyl with 1 to 18 C atoms.

Preferably, the diols Z have a terminal vicinal diol group and in particular have the formula R—CHOH—CH$_2$OH, in which R is linear or branched alkyl with at least 4 C atoms, preferably 4 to 30, especially 4 to 20 and more particularly 6 to 18 C atoms.

The vicinal diols Z are known compounds or can be prepared in a known manner by hydroxylation of epoxides, the epoxides being obtainable from olefins and per-compounds, for example $H_2O_2$ or organic per-acids.

The value q indicates the number of complex-forming compounds Z in formula I; q is preferably from 1 to 20, especially from 1 to 16, more especially from 1 to 10 and very particularly from 1 to 6. In some compounds according to the invention, the desired solubility reaches a very good level even if only one molecule of the complexing compound of the formula Z is present, so that the lower limit of q is 1.

It has also been found that in compounds of the formula I, which contain a relatively low-molecular compound of the formula Z, the solubility can be improved by increasing the number q of vicinal diol molecules Z. Conversely, with higher-molecular compounds of the formula Z, a relatively low number q suffices to achieve good solubility.

If the compounds according to the invention, of the formula I, contain high proportions of vicinal diol of the formula Z, i.e. if q in formula I is greater than about 16, there is the possibility that in fact only a part is bonded directly to the salt, preferably to the cation.

In that case, the product would consist of a very concentrated solution of the compound according to the invention in the vicinal diol Z, which solution also exhibits the desired solubility properties and is embraced by the present invention. Of course it is also possible to employ mixtures of vicinal diols Z in preparing the compounds, whereby the solubity can be influenced.

If M is a proton, q is preferably from 1 to 6, especially from 1 to 3. In that case, it is particularly preferred if one vicinal diol of the formula Z is present per proton in compound I.

Compounds according to the invention, of the formula I, can be prepared in accordance with processes identical with, or analogous to, those described in German Offenlegungsschrift No. 2,330,906. It has been found that those compounds according to the invention, of the formula I, which are derived from water-soluble or organo-soluble inorganic metal salts or metalloid salts, ansolvo-acids or proton-acids can be prepared by the above process. The solubility of inorganic salts in organic solvents is described in, for example, J. Jander and Ch. Lafrenz "Wasserähnliche Lösungsmittel", Verlag Chemie (1968).

Accordingly, the present invention further relates to a process for the preparation of complex compounds of metal salts, metalloid salts, ansolvo-acids or proton-acids, of the formula I, which are derived from water-soluble or organo-soluble metal salts or metalloid salts, ansolvo-acids or proton-acids, wherein the soluble metal salts or their hydrates (aquo-complexes), ansolvo-acids or proton-acids are reacted directly, in aqueous solution or in solution in an organic solvent, with q mols of a vicinal diol of the formula Z per mol of metal salt or acid, after which the water or solvent may or may not be removed from the reaction mixture.

The process, which exists in a plurality of embodiments, is preferably carried out at temperatures of up to 150° C., especially from 30° C. to 120° C.

In one embodiment, the anhydrous metal salts or metalloid salts, ansolvo-acids or proton-acids are reacted directly with the vicinal diols of the formula Z. The reaction is accelerated by warming. In the case of crystalline diols of the formula Z it is advantageous to select a reaction temperature above the melting point of the diol. The reaction is complete after the salt employed has dissolved. Thereafter, any insoluble constituents can be filtered off. Examples of anhydrous salts are $MgCl_2$, $CaCl_2$, $ZnCl_2$, $SnCl_2$, $SnBr_2$, $MnCl_2$ and $CuCl_2$. Gaseous acids, for example HCl or HBr, can be passed into the vicinal diols of the formula Z. When carrying out a reaction with ansolvo-acids it is advantageous not to use excessively high temperatures, in order to repress the replacement of the anions by alcoholate bonds.

In another embodiment, the metal salts, metalloid salts or acids which contain water of crystallisation are employed and reacted with the vicinal diols Z.

In this case, the water of crystallisation can be removed by warming, if appropriate in vacuo, or by azeotropic distillation with an organic solvent, for instance a hydrocarbon, for example hexane, heptane, petroleum ethers, benzene, toluene or xylene, or chloroform.

In general, the salt dissolves at the rate at which the water of crystallisation is displaced. After the reaction, the mixture can be freed from insoluble constituents by filtration and the compound according to the invention can be isolated by distilling off the solvent. Examples of salts containing water of crystallisation are the hydrates of $NiCl_2$, $Ni(CH_3COO)_2$, $FeCl_2$, $AlCl_3$, $CuCl_2$, $CoCl_2$, $CaCl_2$, $MgCl_2$, $MnCl_2$, $ZnCl_2$, $CdCl_2$, $CrCl_3$, $Mg(CH_3COO)_2$, $Cu(CH_3COO)_2$ and $Co(HCOO)_2$.

When using salts which in particular are strong Lewis acid (ansolvo-acids), discolourations of the reaction product are frequently observed in the above method of preparation. It has been found that these discolourations can be avoided by starting from an anhydrous solution of the Lewis acid in an ether or alcohol, warming the mixture, after addition of the vicinal diols Z to the reaction, and then removing the ether or alcohol by distillation, if appropriate in vacuo. When using a solution in an ether, it is also possible to remove the ether, before adding the vicinal diol Z, to the point that the ether adduct of the Lewis acid remains, and to use the adduct as the starting material. Suitable ethers and alcohols are in particular low-molecular compounds which are easily removable by distillation, for example diethyl ether, tetrahydrofuran, methanol and ethanol. Examples of Lewis acids are $AlCl_3$, $FeCl_3$, $SnCl_4$, $MoCl_5$, $SbCl_5$, $SbF_5$, $BF_3$ and $SbF_3$.

In a further embodiment of the process, the compounds according to the invention are obtained by dissolving the anhydrous salts or acids, or the salts or acids containing water of crystallisation, in a suitable organic solvent and then adding a vicinal diol Z and carrying out the reaction. After removing the solvent, the desired product is obtained. In this process, the water of crystallisation is in general removed together with the solvent. Preferred solvents are those which are also capable of dissolving vicinal diols Z. Examples are ethers, for instance diethyl ether and tetrahydrofuran, alcohols, for instance methanol and ethanol, and chloroform, dimethylformamide, dimethylsulphoxide and acetonitrile, whilst examples of salts are KI, NaBr, $AgNO_3$, $CuSO_4.5H_2O$, $Na_2S_2O_3.5H_2O$ and $Cd(CH_3COO)_2.2H_2O$.

In a particular embodiment of the process, complex compounds of the formula I, in which X is hydroxyl, are prepared by reacting a metal hydroxide or oxide or a hydrate thereof with q mols of a vicinal diol Z per mol of hydroxide or oxide, and thereafter sufficient water is expelled to leave a number of hydroxyl groups corresponding to the valency of the metal cation. When using the metal oxides, it is assumed that alcoholates are first formed, with elimination of water, and that these alcoholates are again hydrolysed by the water of reaction.

Metal oxides and hydroxides preferred in this case are those which in aqueous solution have $pK_b$ values of at most 9, preferably at most 4.5, with negative values indicating very strong bases. Examples are the oxides and hydroxides of the alkali metals and alkaline earth metals, of monovalent thallium and of silver.

The processes with the proton acids are in principle no different. Thus, the proton-acids to be complexed can be introduced directly into the vicinal diol Z, in the presence or absence of a solvent, for example a hydrocarbon. Advantageously the mixture is cooled both during this addition, and during the post-reaction required to obtain a clear solution, so as not to exceed a temperature of 50° C. When using a dilute aqueous proton-acid, the water is advantageously removed in the presence of a vicinal diol Z by azeotropic distillation, it also being possible to use solvents.

The complex compounds according to the invention, of the formula I, can, surprisingly, also be prepared by a novel two-stage process which starts from basic or non-basic metal alcoholates or metalloid alcoholates or esters of oxy-acids and in which the anion is introduced in a second stage of the reaction. This general process can also be used to convert metal salts or metalloid salts or proton-oxyacids, which are insoluble in water and in organic solvents, into the soluble compounds according to the invention. The reaction is simple, takes plce with virtually quantitative yields and has the advantage that virtually all metal salts of acids can be prepared in the form according to the invention.

The present invention further relates to a process for the preparation of a complex compound of a metal salt or metalloid salt or proton-oxyacid, which compound corresponds to the general formula I, or the preparation of a mixture of such compounds, wherein first a basic or non-basic metal alcoholate or metal-oxy alcoholate, or a non-basic metalloid alcoholate, or an ester of an acid with q mols of a vicinal diol Z, or a compound of the formula I, in which X is hydroxyl, is prepared, and (a) this basic or non-basic alcoholate or compound of the formula I, in which X is hydroxyl, is then reacted in the stoichiometric amount with an anhydrous compound of the formula $H_nX^n$, in which n and X are as defined earlier, which in aqueous solution forms an acid having a $pK_a$ value of at most 15.8 or, if M is a hydrogen atom, having a $pK_a$ value of at most 11, or with an ammonium salt $A_nX^n$, in which A is an ammonium cation and n and X are as defined earlier, with removal of water, ammonia or amine, or (b) the basic alcoholate or a compound of the formula I, in which X is hydroxyl, is then reacted with a stoichiometric amount of an acid anhydride, an acid halide or an acid ester of the acids defined for the compounds of the formula I, with removal of the alcohol when using the acid ester, or (c) to prepare the compounds, in which M is a hydrogen atom, the ester of a proton-oxyacid with a complex-forming compound of the formula Z, or an ester with an aliphatic alcohol, in the presence of q mols of a vicinal diol Z, is reacted with the stoichiometric amount of water, accompanied by removal of the alcohol formed in the case where an aliphatic ester of the acid is used.

In the compounds $H_nX^n$ and $A_nX^n$, n is preferably an integer from 1 to 3 and the $pK_a$ value of the acid is at most 7, in particular at most 4. By way of explanation, it should be mentioned that the $pK_a$ value of 15.8 just includes water as the weakest acid.

The reaction can be carried out in the presence or absence of a solvent. Suitable solvents are, in particular, volatile ethers, for example diethyl ether, but preferably hydrocarbons, for example pentane, hexane, benzene, toluene and xylene, which can easily be removed again from the reaction mixture by distillation, if appropriate in vacuo, in order to prepare the pure complex compounds according to the invention. Any insoluble constituents can be filtered off before the distillation.

The process is in general carried out at room temperature (for example 20° C.) up to temperatures of 150° C., preferably 50° C. On adding the reactants (anhydrous proton-acid, acid anhydride, acid ester and acid halide) a strong exothermic effect is in general observed. In some cases it may therefore be advantageous to cool the reaction mixture. To remove the solvent used, warming may or may not be necessary.

The metal alcoholates, metalloid alcoholates and metal oxide-alcoholates of the complex-forming compounds of the formula Z, which are used as starting materials for the process according to the invention, are prepared in accordance with various known processes:

(a) In the simplest case, a metal oxide or hydroxide, or a hydrate thereof, is reacted with the vicinal diol Z and, to prepare the pure alcoholate, the water of reaction formed is removed, for example by azeotropic distillation. To form the basic alcoholates, only a part of the water of reaction is removed.

This process is in particular suitable for strong metal bases, for example bases of the alkali metals and alkaline earth metals, for instance NaOH, KOH, LiOH, RbOH, Sr(OH)$_2$, Ca(OH)$_2$, SrO, CaO, BaO and Ba(OH)$_2$.8-H$_2$O.

(b) The reaction of alkali metal alcoholates or alkaline earth metal alcoholates, especially the Li, Na and K alcoholates, of the vicinal diols Z with metal halides, metalloid halides and metal oxyhalides also gives the corresponding alcoholates, with formation of an alkali metal halide or alkaline earth metal halide.

(c) The reaction of metal halides, for example the chlorides or bromides, with the vicinal diols Z, in the presence or absence of catalytic amounts of an alkali metal such as Li or Na, also gives the alcoholates, with elimination of hydrogen halide. The reaction is in general carried out at temperatures of up to 200° C. or more.

(d) It is also possible to start from the metal alcoholates, metalloid alcoholates and metal-oxy alcoholates with lower, volatile alcohols, for example methanol or ethanol, and react these with a vicinal diol Z, the alcohol formed being removed by distillation. For example, the alcoholates of the metals Mg, Al, Sb, Ca, Ti and Sn or of the zirconyl cation are obtained in this way.

(e) It is also possible to react metal complexes, for example the acetylacetonates, with vicinal diols Z, with displacement of the ligand, for example acetylacetone, to give the corresponding metal alcoholates, for example in the case of complexes of Ni, Cu, Zn and Sn(II).

(f) The action of vicinal diols Z on metal acetates, for example of lead or bismuth, in many cases also gives the corresponding alcoholates, with removal of acetic acid.

(g) The complex compounds according to the invention, of the formula I, in which X is hydroxyl, can also be used as starting materials for the process according to the invention and can furthermore themselves be prepared in accordance with this process of the invention.

(h) The basis metal alcoholates and metal-oxy alcoholates and the compounds according to the invention, of the formula I, in which X is hydroxyl, can, when used as starting materials, also be prepared in situ. For this purpose, the metal alcoholates, metalloid alcoholates or metal-oxy alcoholates of g mols of a vicinal diol Z and the metal are reacted with a stoichiometric amount of water or with less than this quantity, down to half the stoichiometric amount.

The process according to the invention may be carried out in various forms. In the case of the reaction of the virtually anhydrous proton-acids H$_n$X$^n$ with the abovementioned starting materials, the procedure followed is in general to add the anhydrous proton-acid, preferably in portions, to the starting materials. Virtually anhydrous means, in the present context, that only traces of moisture, which do not adversely affect the process according to the invention, are present. Gaseous proton-acids, for example the hydrogen halides and hydrogen pseudohalides, are, in this reaction, introduced continuously, preferably into the solution of the starting materials in hydrocarbons; exact metering (to give the stoichiometric amount) is advantageous. Crystalline anhydrous proton-acids, for example phosphoric acid, are preferably added as solids, whilst liquid proton-acids, for example concentrated sulphuric acid, are also added undiluted, advantageously to a cooled solution of the alcoholates in petroleum ether. After completion of the addition, the mixture is in general allowed to react further. Thereafter, any insoluble constituents can be filtered off and the compound according to the invention can be isolated in accordance with the customary methods.

If the basic alcoholates, and the compounds of the formula I, in which X is hydroxyl, are prepared in situ, either the water is added in the presence of an anhydrous compound H$_n$X$^n$, an ammonium salt or an acid anhydride, acid halide or acid ester, or the abovementioned starting materials are first prepared and only then is the reagent for introducing the anion X added, without isolating the starting materials which have been formed.

The compounds of the formula I, in which X is hydroxyl, are obtained by the process according to the invention by reacting the metal alcoholates, metal-oxy alcoholates or metal-dioxy alcoholates of the vicinal diols Z and the metals with a stoichiometric amount of water. This reaction is advantageously carried out in a hydrocarbon solvent, for example n-heptane, and at temperatures of up to 50° C., preferably at room temperature. Further particularly suitable solvents are hydrocarbons, for example pentane, hexane, petroleum ether, octane, benzene and toluene.

In the reaction with anhydrous proton-acids, the non-basis alcoholates are preferred as starting materials, since in that case the desired compounds according to the invention are obtained directly when the solvent used is removed. However, it is also possible to employ the basic alcoholates or the compounds of the formula I, in which X is hydroxyl, without this causing difficulties. It is merely necessary to remove the water of reaction formed, preferably by azeotropic distillation. This reaction is therefore advantageously carried out with hydrocarbons as solvents, with which the water can at the same time be azeotropically removed.

A large number of proton-acids of the formula H$_n$X$^n$ which can be prepared in the anhydrous form is known. Crystalline proton-acids may contain water of crystallisation but this does not interfere with the process according to the invention and can be removed after the reaction. In addition to the proton-acids already mentioned, H$_2$[Fe(CN)$_6$], H$_2$[PtF]$_6$ and H[Mn(CO)]$_5$ may be mentioned as examples of inorganic complex acids.

Some of the proton-acids are unstable in the free form or do not exist in this form, and it is to be regarded as an important advantage of the process according to the invention that the anions of unstable acids can be introduced into the starting materials used according to the invention via their stable ammonium salts. However, this embodiment of the process according to the invention is not restricted to these ammonium salts but can be carried out generally for all ammonium salts. It should also be mentioned that instead of the proton-acids H$_n$X$^n$ the complex acids according to the invention, of the formula H$_n$X$^n$.qZ, can generally be used as starting material, and this is very advantageous in the case of, for example, hypophosphorous acid and the hypophosphites.

Specifically, the procedure followed in this embodiment is to warm the starting materials and the ammonium salts of the formula A$_n$X$^n$ together, whereby the resulting ammonia, the amine and the water of reaction, which is formed when using the basic alcoholates of formula I according to the invention, in which X is hydroxyl, are expelled. The water is advantageously removed by azeotropic distillation. Preferably, the non-basic alcoholates are used as starting materials.

Amongst the ammonium salts, those which form volatile amines during the reaction are particularly suitable. A in the formula $A_nX^n$ is preferably $NH_4^\oplus$ or alkylammonium with $C_1$–$C_4$-alkyl groups, especially with $C_1$–$C_2$-alkyl groups. Particularly preferred groups are $NH_4^\oplus$ amd monoalkylammonium, with methyl and ethyl as alkyl. The reaction temperature is up to 150° C., preferably up to 110° C. The compounds according to the invention are isolated by conventional methods.

In a further embodiment, the basic alcoholates and the compounds according to the invention, of the formula I, can be used as starting materials and reacted with acid anhydrides, acid halides and acid esters. This reaction can be carried out with or without solvent and in general takes place exothermically so that additional warming of the reaction mixture is not necessary. In general, the acid ester, acid halide or acid anhydride is added to the alcoholate either all at once or in portions or, in the case of gases, continuously. The desired products are isolated in accordance with the customary methods. The reaction is best carried out at room temperature, if necessary with cooling.

Suitable acid anhydrides are in particular the anhydrides of the organic acids, and the acid-forming oxides of the elements C, N, P, S, Se, Cl, Br and I. Examples are $CO_2$, $N_2O_5$, $P_2O_3$, $P_2O_5$, $SO_2$, $SO_3$, $SeO_3$, $Cl_2O_7$, $BrO_3$, $I_2O_5$, $N_2O_3$ or $I_2O_7$, as well as acetic anhydride, trifluoroacetic anhydride and benzoic anhydride. When using mixed organic anhydrides, such as the mixed anhydride of benzoic acid and acetic acid, mixtures of compounds of the formula I, in which X is, for example, benzoate and acetate, are obtained.

Particularly suitable acid halides are the chlorides and bromides. The acid component is preferably derived from inorganic and organic acids and from organic oxy-acids of phosphorus and sulphur. Examples are $SCl_2$, $S_2Cl_2$, $SeCl_2$, $SOCl_2$, $SO_2Cl_2$, $POCl_3$, $COCl_2$, $SO_2Br_2$, $POBr_3$, $CH_3COCl$, $C_6H_5COCl$, methylsulphonyl bromide and phenylphosphonyl chloride. When using the acid halides, mixtures of compounds of the formula I, in which X is halide and another anion, of an inorganic or organic acid, are in principle obtained.

Specifically, this embodiment of the process according to the invention can be carried out by adding the anhydrides or acid halides all at once, or in portions, to the starting materials, and allowing the mixture to react further in order to complete the reaction. Advantageously, the process is carried out with a solvent, and at temperatures of up to 110° C., preferably at room temperature. The isolation of the compounds according to the invention, of the formula I, is carried out in accordance with customary methods.

In another embodiment of the process according to the invention, the acid esters are used as reactants for introducing the anion X. A great advantage of this reaction is that in this way it is possible to introduce the anions X of the oxo-acids, which are unstable in the free form. Particularly suitable compounds used are the esters of the inorganic and organic carboxylic acids, of the inorganic oxyacids of the elements N, P, S, Se and the amphoteric elements, and of the organic oxy-acids of sulphur and phosphorus. The esters are preferably derived from volatile aliphatic alcohols with 1 to 4 C atoms. In particular, the methyl esters and ethyl esters are used. The possible methods of preparation of esters are known from the literature. In the reaction of the esters of the amphoteric elements, it is preferred to start from the compounds according to the invention, of the formula I, in which X is hydroxyl. Examples of esters are dimethyl carbonate, diethyl carbonate, methyl orthocarbonate, dimethyl phosphite, dimethyl phosphate, dimethyl phosphonite, dimethyl phosphonate, diethyl sulphite, dimethyl sulphate, methyl esters and ethyl esters of the sulphonic and sulphinic acids, trimethyl arsenite, trimethyl arsenate, trimethyl antimonite, trimethyl antimonate, tetraethyl silicate, tetramethyl silicate, tetramethyl germanate, tetramethyl stannate, trimethyl borate, trimethyl aluminate, tetraethyl zirconate, tetramethyl titanate, dimethyl molybdate, dimethyl tungstate, diethyl chromate and trimethyl vanadate.

To carry out the reaction, the esters are added to the starting materials. Thereafter the mixture is preferably warmed and the alcohol formed distilled off continuously; this can be accelerated by applying a vacuum. The reaction can be carried out with or without solvent, and depending thereon, the product obtained after completion of the reaction consists of the complex compounds according to the invention or their solutions, which are purified in accordance with the customary methods.

In this way it is also possible to obtain complex compounds of those oxyacids which are derived from certain non-metals and from the amphoteric elements and which tend to form condensed anions. Examples of these are P, As, Sb, Si, Ge, Sn, B, Al, Cr, Mo, W, V, Ti and Zr. These elements are known to give, for example, dimeric, trimeric, tetrameric and polymeric anions of various structures. Depending on the process of preparation, these compositions obtained according to the invention still contain acid ester bonds in the anions, for example if the oxo-acid ester used is hydrolysed with an excess of $H_2O$. On complete hydrolysis of the oxo-acid ester used, the corresponding ortho-anions are first formed, from which polyanions are formed by condensation with removal of the water of reaction, preferably by means of azeotropic distillation. It is also possible for such condensation reactions already to take place during the hydrolysis. Depending on the amount of the water of reaction removed, different polyanions can thus be formed from one element, for example, in the case of silicon, anions of the empirical formulae $SiO_3^{2-}$, $Si_2O_5^{2-}$ and $Si_3O_7^{2-}$, or metaphosphate, metaborate, metaaluminate, metaarsenate, metatitanate, zirconate and metaantimonate ions. Depending on the degree of polycondensation of the anions, the products are volatile to oily liquids or waxy to resinous solids. The latter may also be used as resins, for example casting resins, for the production of mouldings.

Proton-oxyacids can also be complexed by this process to give the compounds I according to the invention, if the acids are in the form of an ester (variant c) of the process according to the invention), by hydrolysing this ester with stoichiometric amounts of water in the presence of a vicinal diol Z. Depending on the nature of the ester, various embodiments of the process are possible.

If aliphatic or aromatic esters are concerned, preferably esters with lower alkanols which have about 1 to 6, preferably 1 to 2, C atoms, since these can easily be removed by distillation after the reaction, the ester is mixed with q mols of vicinal diol Z and the corresponding amount of H₂O is added. The mixture is then stirred until a homogeneous product is obtained and the alcohol formed has been removed (by distillation, if appropriate in vacuo).

This can then be followed by a condensation reaction with removal of the water formed, as described above, for the preparation of the acids with oligomeric to polymeric anions. The reaction can be carried out without solvents but is preferably carried out with solvents, for example volatile ethers and especially hydrocarbons. In general, the reaction is carried out at room temperature and preferably the temperature should not exceed 50° C.

In another variant, esters of the oxyacids with q mols of vicinal diol Z are used as the starting material and hydrolysed, in the presence or absence of solvents, with stoichiometric amounts of water. In other respects the procedure described earlier can be followed. The esters are easily obtainable by trans-esterification reactions of, for example, alkyl esters of the oxyacids with the vicinal diols Z.

The complex compounds according to the invention, of the formula I, in which M is a proton, are for their part outstandingly suitable for use as intermediates for the preparation of the metal salts and metalloid salts in accordance with the process of the invention. For this purpose, the complex acids of the formula $H_nX^n.pY.qZ$ are added, in accordance with the embodiments described earlier, to the basic or non-basic alcoholates and the alcohol formed is removed from the reaction mixture. Furthermore it is possible to react metal oxides and metal hydroxides in this way, with removal of the water formed. For this purpose, the reaction temperature can be up to 150° C., preferably up to 50°–100° C.

Suitable starting components for the complex acids according to the invention are the same acids as have been listed earlier in connection with the metal salts, provided they have a $pK_a$ value of at most 11. The inorganic acids, and the strong organic acids ($pK_a$ values of at least 4) are particularly preferred. Preferably, these starting acids have $pK_a$ values of at most 7, in particular at most 4.

To illustrate possible embodiments of the process according to the invention, equations are given below of examples. In these, Z represents the vicinal diol which is formed by taking up a proton from the alcoholate ligand Z'O—.

(a) Alcoholate + anhydrous proton-acid

Ba(OZ')₂.2Z + H₂SO₄(concentrated) → BaSO₄.4Z (b) Alcoholate + ammonium salt

Mg(OZ')₂.2Z + 2NH₄F → MgF₂.4Z + 2NH₃

(c) Basic alcoholate + acid anhydride

(d) Basic alcoholate + acid halide

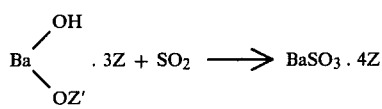

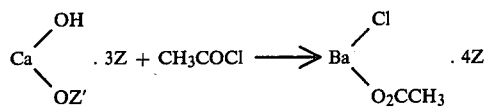

(e) Compound according to the invention, of the formula I, in which X is hydroxyl, + ester 2Ba(OH)₂.4Z + Si(OCH₃)₄ → Ba₂SiO₄.8Z + 4CH₃OH (f) Ester with vicinal diol + water Si(OZ')₄ + 4H₂O → Si(OH)₄.4Z (g) Ester + vicinal diol + water Ti(OCH₃)₄ + 3Z + 4H₂O → Ti(OH)₄.3Z + 4CH₃OH (h) Hydroxide + complex proton-acid according to the invention Ba(OH)₂ + H₂SO₄.4Z → BaSO₄.4Z + 2H₂O It remains to be mentioned that the compounds according to the invention, of the formula I, which contain the anion of a volatile acid, can be reacted with stronger non-volatile anhydrous acids, whereby the volatile acid is displaced. In this way, compounds according to the invention can be converted into others, for example:

Ni(O₂CCH₃)₂.4Z + H₃PO₃ → NiHPO₃.4Z + 2CH₃COOH

The complex salt can also be prepared by reacting a complex base with an acid which may or may not be a complex acid. This variant of the process is preferably carried out in a solvent, such as toluene or heptane. The water thereby formed can remain as the ligand Y in the system or can be removed, for example by azeotropic dehydration. The following may be given as an example LiOH.qZ + HClO₄.q'Z → LiClO₄.(q+q')Z + H₂O in which q' is 0 or q, and q is as defined above.

The complex compounds according to the invention, of the composition I, are of a crystalline, waxy or mobile to viscous consistency depending on which anions, cations and vicinal diols Z they contain, and in what ratio. They exhibit a remarkably high heat stability, which indicates that the complexing compounds of the formula Z are relatively firmly bonded. This conclusion is also supported by the fact that numerous examples are crystalline compounds which can be recrystallised, without change of their composition, from suitable solvents. The vicinal diol structural element thus evidently exhibits a surprisingly high affinity, which ensures high stability and a broad range of applications.

The compounds according to the invention are, in general, stable to air and to moisture. Thus, during the actual preparation, the compounds are not decomposed by the water formed, which is introduced into the reaction mixture as, for example, water of crystallisation of the inorganic salts. If substantial amounts of water are added, hydrolytic destruction of the compound occurs, especially if a solubilising additive such as tetrahydrofuran, dioxane or methanol is also present.

A particularly noteworthy property is the surprisingly good solubility of the compounds according to the invention in numerous organic solvents, even in nonpolar, aprotic solvents, for example hydrocarbons. The solubility can be varied through the choice, and number, of the vicinal diols Z. Thus, it has been found that compounds of the formula Z with branched radicals as a rule give compounds according to the invention which are of a liquid consistency and with which the solubility is, in contrast to the crystalline compounds, merely a question of miscibility. The compatibility with natural and synthetic plastics is also very good.

Surprisingly, the compounds according to the invention exhibit an excellent antistatic activity even if only low concentrations are added.

By virtue of their properties, the compounds according to the invention are outstandingly suitable for the antistatic treatment of natural and synthetic polymers, lubricants and fuels, solutions and solvents based on hydrocarbons. The highest activity is exhibited by the complex proton-acids.

A further subject of the present invention is a mixture of materials comprising a natural or synthetic polymer, a natural or synthetic lubricant or a fuel, a solution or a solvent based on hydrocarbons, and a complex compound of the formula I.

Preferably, the compounds of the formula I are present in an amount of from 0.001 to 15% by weight, preferably from 0.01 to 10, especially 0.01 to 5, and more particularly 0.01 to 3, % by weight.

Examples of suitable thermoplastic polymers are the following thermoplastics

1. Polymers which are derived from singly or doubly unsaturated hydrocarbons, for example polyolefins, for instance polyethylene, which may or may not be crosslinked, polypropylene, polyisobutylene, polymethylbut-1-ene, polymethylpent-1-ene, polybut-1-ene, polyisoprene, polybutadiene, polystyrene, polyisobutylene, copolymers of the monomers on which the above homopolymers are based, for example ethylene-propylene copolymers, propylene-isobutylene copolymers and styrene-butadiene copolymers, as well as terpolymers of ethylene and propylene with a diene, for example hexadiene, dicyclopentadiene or ethylidenenorbornene, and mixtures of the abovementioned homopolymers, for example mixtures of polypropylene and polyethylene, polypropylene and polybut-1-ene, or polypropylene and polyisobutylene.

2. Polyamides and copolyamides which are derived from diamines and dicarboxylic acids and/or from aminocarboxylic acids or the corresponding lactams, for example polyamide 6, polyamide 6/6, polyamide 6/10, polyamide 11 and polyamide 12.

3. Polyesters which are derived from dicarboxylic acids and dialcohols and/or from hydroxycarboxylic acids or the corresponding lactones, for example polyethylene terephthalate, poly-1,4-dimethylol-cyclohexane terephthalate, polypivolactone and poly-1,4-butylene terephthalate.

4. Polyacrylonitrile and copolymers of acrylonitrile with other vinyl compounds, for example acrylonitrile/butadiene/styrene, acrylonitrile/styrene and acrylonitrile/styrene/acrylic ester copolymers. Further vinyl compounds which may be used to form copolymers are vinyl chloride, vinyl bromide and vinylidene chloride.

5. Unplasticised-including chlorinated-polyvinyl chloride and unplasticised copolymers of vinyl chloride, for example with vinyl acetate, and mixtures of these polymers with other copolymers and chlorinated polyolefins, with a predominating proportion of vinyl chloride in the total mixture.

6. Plasticised polyvinyl chloride, including the use of butadiene-acrylonitrile copolymers, provided the proportion of vinyl chloride in the total mixture predominates.

Suitable plasticisers include dibutyl phthalate, di-2-ethylhexyl phthalate, dibutyl sebacate, acetyl tributyl citrate, acetyl tri-2-ethylhexyl citrate, diphenyl 2-ethylhexyl phosphate, alkylsulphonic acid esters ($C_{12}$-$C_{20}$) of phenol and of the cresols, and polymeric plasticisers, for example polyesters of adipic acid with 1,3-butanediol and hexanediol, and polyesters of adipic acid with 1,3-propanediol and/or 1,2-propanediol, the free OH groups of the polyesters being acetylated or non-acetylated.

7. Polyurethanes and polyureas.

8. Polyacetals, for example polyoxymethylene and polyoxyethylene, as well as those polyoxymethylenes which contain ethylene oxide as a comonomer.

Examples of suitable natural polymers are vegetable and animal fibres which can be converted to fabrics of all kinds. Examples include cotton, jute, hemp, sheep's wool, camelhair or silk.

Before, after or simultaneously with the compounds used according to the invention, of the formula I, conventional additives used for the processing, and improvement of properties, of these polymers may be added to the substrates, examples of such additives being plasticisers, heat stabilisers, antioxidants, dyes, fillers, especially reinforcing fillers such as sized glass fibres, lubricants, light stabilisers and flameproofing agents.

The substances to be used according to the invention can be incorporated after polymerisation, for example by mixing the substances, with or without further additives, into the melt, in accordance with the methods customary in the art, before or during the shaping process. The substances can also be incorporated in the form of a master batch, which contains the compounds in a concentration of, for example, from 2.5 to 25% by weight, into the polymers to be rendered antistatic.

The compounds used according to the invention, of the formula I, may also be used for the external antistatic treatment of articles consisting of thermoplastic, thermosetting and natural polymers, especially the treatment of fibres, by applying them, in the form of solutions, by spraying or dipping. Examples of suitable thermosetting plastics are epoxide resins, resins of unsaturated dicarboxylic acid esters, melamine-formaldehyde resins, urea-formaldehyde resins, diallyl phthalate resins and phenol-formaldehyde resins. Suitable solvents for the compounds according to the invention are, in addition to hydrocarbons, ethers, alcohols, esters, sulphones and acid amides.

Further substrates suitable for antistatic treatment are natural, for example mineral, and synthetic lubricants. The lubricants in question are familiar to those skilled in the art and are described, for example, in the "Schmiermittel Taschenbuch" ("Lubricant Handbook") (Hüthig Verlag, Heidelberg, 1974).

The lubricants may in addition contain other additives which are added in order to improve the properties, for example anti-corrosion agents, antioxidants, metal passivators, viscosity index improvers, pour point depressants, dispersants, detergents and other extreme pressure/anti-wear additives.

Suitable fuel substrates (engine fuels) based on hydrocarbons are also familar to those skilled in the art. They may also contain further additives, for example antiknock agents.

The compounds according to the invention may also be used to render solutions or solvents based on hydrocarbons antistatic, examples being pentane, hexane, heptane, cyclohexane, petroleum ether fractions, benzene, toluene or xylene, in order effectively to prevent a build-up of antistatic charge by friction during flow processes, and hence to prevent the explosion hazard associated therewith.

A further field of use of the compounds according to the invention is for the surface treatment of glasses. In this, direct application to the surface may suffice, or stronger fixing, for example as a result of chemical reactions, may be effected by a heat after-treatment. Examples of suitable compounds are titanium, tin, indium and antimony compounds of the formula I and especially those which contain fluoride or silicate anions.

The compounds according to the invention are also suitable for use as heat stabilisers and light stabilisers for PVC. Compounds of the formula I particularly suitable for this purpose are those in which M is Ca, Ba, Mg, Sr, Na, Zn, Cd, Sn or Ni and Y is a sulphite, sulphide, borate, phosphite, phosphate or silicate anion, and the remaining symbols are as defined above.

The examples which follow serve to illustrate the present invention. In these, parts are parts by weight and percentages are percentages by weight.

EXAMPLES

(I) Preparation Examples 1-16

The compounds listed in Table 1 have been prepared in accordance with one of processes A–F$_7$ below. The composition of the compounds according to the invention, and some properties, are also given in Table 1.

Where other reaction temperatures or solvents have been used, this is stated in the notes in Table 1.

The values of the refractive index or melting point can to a slight degree depend on the starting materials used, and also on their purity.

Process A

A vicinal diol Z and a metal salt are stirred at 120°–130° C. until a clear melt is produced (up to 5 hours). Thereafter, the material can be taken up in a solvent, any turbidity can be removed by filtration, and in the case of crystalline compounds the latter can be recrystallised to purify them. The yields are virtually quantitative. The further purification operations can result in losses in yield.

Process B

A vicinal diol Z and a metal salt etherate of diethyl ether are warmed to 100°–130° C., with stirring, until the ether liberated has been quantitatively removed in vacuo. Purification can be carried out as in A. The yields are virtually quantitative. (This process is particularly suitable for ansolvo-acids, for examples BF$_3$, AlCl$_3$, MoCl$_5$ and SnCl$_2$).

Process C

A vicinal diol Z and a metal salt containing water of crystallisation are warmed under reduced pressure to 90°–100° C., using a rotary evaporator, until the water of crystallisation has been removed quantitatively. Further purification can be carried out as in A. The yields are virtually quantitative.

Process D

A vicinal diol Z and the metal salt containing water of crystallisation are mixed with toluene or n-heptane and then heated under reflux until the water of crystallisation has been removed quantitatively. The solvent is then distilled off under reduced pressure. Further purification can be carried out as in A.

Process E

The anhydrous metal salt is dissolved in dimethylformamide and the vicinal diol Z is added. The dimethylformamide is then distilled off in an oil pump vacuum at 60°–70° C. The yields are virtually quantitative. Purification can be carried out as in A.

Process F$_1$

A metal alcoholate of a vicinal diol Z is prepared according to one of processes a to f. An anhydrous proton-acid or water, to prepare the hydroxides, is then added to the mixture at 20°–30° C., with thorough stirring (cooling being advantageous), and stirring is continued for 30 minutes at 20°–30 ° C.

The solvent is then distilled off under reduced pressure. The yields are virtually quantitative. Purification can be carried out as in A.

Process F$_2$

Sufficient water of reaction is removed from a mixture of a vicinal diol Z, a metal hydroxide and toluene as the solvent, while stirring under reflux, that a basic alcoholate is formed.

An acid anhydride is then added to the mixture at 25° C. (gaseous acid anhydrides are introduced until saturation is reached).

The solvent is then distilled off under reduced pressure.

Purification can be carried out as in A.

Process F$_3$

An alcoholate of a vicinal diol Z and an ammonium salt are heated under reflux in heptane until the ammonia gas liberated has been expelled completely. The solvent is distilled off under reduced pressure. The yields are virtually quantitative.

Purification can be carried out as in A.

Process F$_4$

To an alcoholate of a vicinal diol Z, dissolved in heptane, is added the stoichiometric amount of water corresponding to the alcoholate. The mixture is stirred at 20° C. until the solution is homogeneous.

An acid ester is then added, the mixture is heated for 30 minutes under reflux and the solvent is distilled off under reduced pressure. The yields are virtually quantitative. To form polymeric anions (SiO$_3^-$ or Si$_2$O$_5^{2-}$), the water of condensation is azeotropically removed at the same time.

Purification can be carried out as in A.

Process F$_5$

A complex metal carboxylate (metal acetate) or metal alcoholate of a vicinal diol Z is heated under reflux with an anhydrous proton-acid in heptane for some time. The solvent together with the carboxylic acid (acetic acid) or alcohol is then distilled off under reduced pressure. The last remnants of solvent and carboxylic acid (acetic acid) or alcohol are removed in an oil pump vacuum at 60° C.

The yields are virtually quantitative. Purification can be carried out as in A.

The anhydrous proton-acid can also be employed as a complex according to the invention, of the formula I.

Process F$_6$

The acid to be complexed is introduced into a mixture of vicinal diol Z and solvent (heptane or toluene) at 20° C. and the mixture is stirred until a clear solution is obtained. The solvent is then removed under reduced pressure. In the case of dilute aqueous acids (for example hypophosphorous acid), the water is removed by azeotropic distillation in the presence of the complexing agent.

Process F$_7$

Complexed Si(OH)$_4$ is prepared by hydrolysing tetramethyl silicate in the presence of the vicinal diol Z with a stoichiometric amount of water and distilling off methanol.

To prepare complexed hydrated SiO$_2$ (silicic acid) sufficient H$_2$O is added to tetramethyl silicate, in the presence of the complexing agent, that hydrated SiO$_2$ must form (this would correspond to freshly precipitated silicic acid), and the methanol formed is distilled off.

TABLE 1

| Example | Salt or acid | Vicinal diol Z | Number q | Prepared according to process | Notes | Properties (melting point, refractive index) |
|---|---|---|---|---|---|---|
| 1 | BaSO$_4$ | CH$_3$$-$(CH$_2$)$_{12-15}$CH(OH)$-$CH$_2$(OH) | 3 | F$_1$ | | 57–60° C. |
| 2 | CaCl$_2$ | CH$_3$$-$(CH$_2$)$_{12-15}$CH(OH)$-$CH$_2$(OH) | 3 | F$_1$ | | 72–77° C. |
| 3 | MgCl$_2$ | CH$_3$$-$(CH$_2$)$_{12-15}$CH(OH)$-$CH$_2$(OH) | 3 | F$_1$ | | 80–90° C. |
| 4 | hydrate SiO$_2$ | CH$_3$$-$(CH$_2$)$_{12-15}$CH(OH)$-$CH$_2$(OH) | 2 | F$_7$ | | 60–65° C. (sintered) |
| 5 | Mg[SiO$_3$] | CH$_3$$-$(CH$_2$)$_{12-15}$CH(OH)$-$CH$_2$(OH) | 2 | F$_4$ | | polymer |
| 6 | Ni[HPO$_3$] | CH$_3$$-$(CH$_2$)$_{12-15}$CH(OH)$-$CH$_2$(OH) | 2 | F$_5$ | | 60–70° C. |
| 7 | Ca[SO$_3$] | CH$_3$$-$(CH$_2$)$_{12-15}$CH(OH)$-$CH$_2$(OH) | 2 | F$_2$ | | 60–70° C. |
| 8 | Si[OH]$_4$ | CH$_3$$-$(CH$_2$)$_{12-15}$CH(OH)$-$CH$_2$(OH) | 2 | F$_7$ | | 60–63° C. |
| 9 | Ni[TiO$_3$] | CH$_3$$-$(CH$_2$)$_{12-15}$CH(OH)$-$CH$_2$(OH) | 3 | F$_4$ | | polymer |
| 10 | Ni[SiO$_3$] | CH$_3$$-$(CH$_2$)$_{12-15}$CH(OH)$-$CH$_2$(OH) | 3 | F$_5$ | | 55–57° C. |
| 11 | Al(OH)$_3$ | CH$_3$$-$(CH$_2$)$_7$CH(OH)$-$CH$_2$(OH) | 4 | F$_1$ | Al determination 6.8% (theoretical value 6.98%) | 125–130° C. |
| 12 | Ti(OH)$_4$ | CH$_3$$-$(CH$_2$)$_7$CH(OH)$-$CH$_2$(OH) | 2 | F$_1$ | | 41–43° C. |
| 13 | Zn[H$_2$PO$_3$]$_2$ | CH$_3$$-$(CH$_2$)$_7$CH(OH)$-$CH$_2$(OH) | 3 | F$_5$ | | smeary test substance |
| 14 | Mg[HPO$_3$] | CH$_3$$-$(CH$_2$)$_7$CH(OH)$-$CH$_2$(OH) | 3 | F$_5$ | | 45–48° C. |
| 15 | Ba[SiO$_3$] | n-C$_4$H$_9$$-$CH(C$_2$H$_5$)$-$CH$_2$$-$CH$_2$$-$CH(OH)$-$CH$_2$(OH) | 3 | F$_4$ | | polymer |
| 16 | Mg(OH)$_2$ | n-C$_4$H$_9$$-$CH(C$_2$H$_5$)$-$CH$_2$$-$CH$_2$$-$CH(OH)$-$CH$_2$(OH) | 3 | F$_1$ | | viscous solution (turbid) |
| 17 | BaBr$_2$ | CH$_3$$-$(CH$_2$)$_{12-15}$CH(OH)$-$CH$_2$(OH) | 7 | E | | wax, m.p.: 48–52° C. |
| 18 | NiCl$_2$ | CH$_3$$-$(CH$_2$)$_{12-15}$CH(OH)$-$CH$_2$(OH) | 6 | D | | wax, m.p.: 65–80° C. |
| 19 | MnCl$_2$ | CH$_3$$-$(CH$_2$)$_{12-15}$CH(OH)$-$CH$_2$(OH) | 4 | D | | wax, m.p.: 65–75° C. |
| 20 | Cu(NO$_3$)$_2$ | CH$_3$$-$(CH$_2$)$_{12-15}$CH(OH)$-$CH$_2$(OH) | 4 | C | | wax, m.p.: 60–65° C. |
| 21 | ZnCl$_2$ | n-C$_8$H$_{17}$CH(OH)$-$CH$_2$(OH) | 3 | A | | semi-solid mass |

TABLE 1-continued

| Example | Salt or acid | Composition of the compound according to the invention Vicinal diol Z | Number q | Prepared according to process | Notes | Properties (melting point, refractive index) |
|---|---|---|---|---|---|---|
| 22 | BF$_3$ | OH  OH<br>\|   \|<br>n-C$_8$H$_{17}$CH—CH$_2$ | 2 | B | | semi-solid mass |
| 23 | H$_3$BO$_3$ | OH  OH<br>\|   \|<br>CH$_3$—(CH$_2$)$_{12-15}$CH—CH$_2$ | 4 | F$_6$ | | wax |

Example 24 (Antistatic action)

0.5% by weight of the substance according to Example 23 and, by way of comparison, 0.5% by weight of the vicinal diol of Example 23, are mixed into polypropylene powder (Propathene HF 20 containing 0.2% of phenolic antioxidant) and the mixture is extruded in a single-screw extruder at 200°–260° C. Test specimens are cut from the extruded sheet first obtained, and are measured after an appropriate conditioning period.

The antistatic effect is measured by means of a Static Honestometer. This measuring instrument makes it possible to determine both the tendency of plastics to acquire a charge, in terms of the charge level (mV) and the course of the charge dissipation with time, in the form of the half-life (which is an indirect measure of the surface resistance).

Climatic conditions: 24° C., 50–55% relative atmospheric humidity.

The results are summarised in the table which follows.

| Test substance | Charge level (mV) (after 3 days' conditioning) | Half-life (sec) after 3 days | after 6 days | after 10 days | after 20 days |
|---|---|---|---|---|---|
| according to Example 23 | 750 | 5.2 | 6.1 | 3.8 | 3.9 |
| 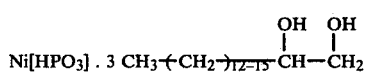 | 700 | 66 | 100 | 120 | 170 |

The substantially greater effect of the substance according to the invention compared to the pure vicinal diol is clearly recognisable.

Example 25

Ni[HPO$_3$] . 3 CH$_3$—(CH$_2$)$_{12-15}$—CH—CH$_2$
                                      |        |
                                     OH     OH 83 g of the corresponding diol, 25 g of nickel acetate. 4H$_2$O and 150 ml of heptane are heated under reflux, with stirring, in an apparatus equipped with a water separator, until the water of crystallisation has been completely expelled. The reaction mixture is cooled to 20° C., 8.2 g of phosphorous acid are added, the mixture is stirred for a further 30 minutes at 80°–90° C. and the solvent together with the acetic acid is then distilled off under reduced pressure. The last remnants of heptane and acetic acid are removed in an oil pump vacuum at 60° C.

Yield: 97 g of a green wax, melting point 52°–56° C.; readily soluble in n-heptane and toluene.

What is claimed is:

1. A compound which has the formula

H$_3$PO$_3$.2C$_7$H$_{15}$—CHOH—CH$_2$OH,

H$_4$SiO$_4$.2(C$_{13}$–C$_{16}$)(H$_{27}$–H$_{33}$)—CHOHCH$_2$OH,

BaSO$_4$.3(C$_{13}$–C$_{16}$(H$_{27}$–H$_{33}$)—CHOH—CH$_2$OH or

NiSiO$_3$.3(C$_{13}$–C$_{16}$)(H$_{27}$–H$_{33}$)—CHOHCH$_2$OH.

2. A method for controlling static which comprises adding to a material selected from the group consisting of natural polymers, synthetic polymers, natural lubricants, synthetic lubricants, fuels, hydrocarbon-based solutions and hydrocarbon-based solvents an effective amount of a compound according to claim 1.

3. An antistatic composition comprising
   (a) a material selected from the group consisting of natural polymers, synthetic polymers, natural lubricants, synthetic lubricants, fuels, hydrocarbon-based solutions and hydrocarbon-based solvents, and
   (b) an effective amount of a compound according to claim 1.

4. A complex compound of the formula

M$_n^m$.X$_m^n$.qZ in which
   M$_n^m$.X$_m^n$ is selected from the group consisting of CaCl$_2$, MgCl$_2$, MgSiO$_3$, NiHPO$_3$, CaSO$_3$, NiTiO$_3$, Al(OH)$_3$, Ti(OH)$_4$, Zn(H$_2$PO$_3$)$_2$, MgHPO$_3$, BaSiO$_3$, Mg(OH)$_2$, BaBr$_2$, NiCl$_2$, MnCl$_2$, Cu(NO$_3$)$_2$, ZnCl$_2$, BF$_3$, H$_3$BO$_3$ and NiHPO$_3$,
   Z is selected from the group consisting of CH$_3$(CH$_2$)$_7$CHOHCH$_2$OH,
   n—C$_4$H$_9$CH(C$_2$H$_5$)CH$_2$CH$_2$CHOHCH$_2$OH and CH$_3$(CH$_2$)$_{12-15}$CHOHCH$_2$OH, and q is 2 to 7.

5. A method for controlling static which comprises adding to a material selected from the group consisting of natural polymers, synthetic polymers, natural lubricants, synthetic lubricants, fuels, hydrocarbon-based solutions and hydrocarbon-based solvents an effective amount of a compound according to claim 4.

6. An antistatic composition comprising
   (a) a material selected from the group consisting of natural polymers, synthetic polymers, natural lubricants, synthetic lubricants, fuels, hydrocarbon-based solutions and hydrocarbon-based solvents, and
   (b) an effective amount of a compound according to claim 4.

* * * * *